United States Patent
Troia

(10) Patent No.: US 10,490,943 B2
(45) Date of Patent: Nov. 26, 2019

(54) SECURING A MEMORY CARD

(71) Applicant: Micron Technology, Inc., Boise, ID (US)

(72) Inventor: Alberto Troia, Munich (DE)

(73) Assignee: Micron Technology, Inc., Boise, ID (US)

( * ) Notice: Subject to any disclaimer, the term of this patent is extended or adjusted under 35 U.S.C. 154(b) by 258 days.

(21) Appl. No.: 15/672,423

(22) Filed: Aug. 9, 2017

(65) Prior Publication Data

US 2019/0050703 A1    Feb. 14, 2019

(51) Int. Cl.

| | | |
|---|---|---|
| H01R 13/639 | (2006.01) | |
| G06K 19/077 | (2006.01) | |
| H01L 21/56 | (2006.01) | |
| G06F 21/86 | (2013.01) | |
| G06F 1/16 | (2006.01) | |
| H05K 7/12 | (2006.01) | |

(52) U.S. Cl.
CPC ......... *H01R 13/6397* (2013.01); *G06F 21/86* (2013.01); *G06K 19/07732* (2013.01); *H01L 21/56* (2013.01); *G06F 1/16* (2013.01); *H01L 2924/1816* (2013.01); *H01R 13/639* (2013.01); *H05K 7/12* (2013.01)

(58) Field of Classification Search
CPC .................................................. H01R 13/6397
See application file for complete search history.

(56) References Cited

U.S. PATENT DOCUMENTS

| | | | |
|---|---|---|---|
| 5,687,592 A | 11/1997 | Penniman et al. | |
| 5,822,183 A * | 10/1998 | Kanda .................. | G06K 7/0047 361/679.32 |
| 6,512,454 B2 | 1/2003 | Miglioli et al. | |
| 6,894,606 B2 | 5/2005 | Forbes et al. | |
| 7,049,970 B2 * | 5/2006 | Allen ................... | G08B 13/126 340/568.2 |
| 7,247,791 B2 * | 7/2007 | Kulpa ..................... | G06F 21/87 174/17 R |
| 7,787,256 B2 * | 8/2010 | Chan ....................... | G06F 21/87 174/250 |
| 9,426,904 B2 * | 8/2016 | Fitzsimmons ....... | H05K 1/0275 |
| 9,521,764 B2 * | 12/2016 | Steiner .................. | B33Y 80/00 |
| 9,633,318 B2 | 4/2017 | Plante | |
| 9,637,134 B2 | 5/2017 | Phelan et al. | |
| 10,321,589 B2 * | 6/2019 | Dragone .............. | H05K 5/0208 |
| 2005/0245136 A1 * | 11/2005 | Yin ..................... | H01R 13/2442 439/630 |
| 2012/0108102 A1 * | 5/2012 | Kim ........................ | G06K 13/08 439/541.5 |
| 2013/0102262 A1 * | 4/2013 | Nealis ...................... | H01Q 1/50 455/90.2 |
| 2016/0055356 A1 * | 2/2016 | Huang ..................... | G06F 21/88 726/35 |

(Continued)

*Primary Examiner* — James Harvey
(74) *Attorney, Agent, or Firm* — Brooks, Cameron & Huebsch, PLLC

(57) ABSTRACT

Apparatuses for securing a memory card. One example apparatus can include a slot coupled to a printed circuit board (PCB), wherein the slot is configured to receive a memory card to provide electrical connection between the PCB and the memory card and a cover coupled to the PCB and configured to enclose the memory card when in a closed position and maintain electrical connection between the memory card and the PCB when in the closed position.

23 Claims, 2 Drawing Sheets

(56) References Cited

U.S. PATENT DOCUMENTS

2016/0072209 A1\* 3/2016 Triplett .............. H01R 12/7076
439/587
2019/0050703 A1\* 2/2019 Troia ............... G06K 19/07732

\* cited by examiner

SECURING A MEMORY CARD

TECHNICAL FIELD

The present disclosure relates generally to memory devices, and more particularly, to apparatuses for securing a memory card.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

A memory card (e.g., a flash card or a memory cartridge) is an electronic flash memory data storage device. A memory card can be a Secure Digital (SD) card or a Micro Secure Digital (μSD) card. A memory card can be used to store vehicle sensor data that can be analyzed as part of an accident investigation, for example.

DETAILED DESCRIPTION

Figure 1A:
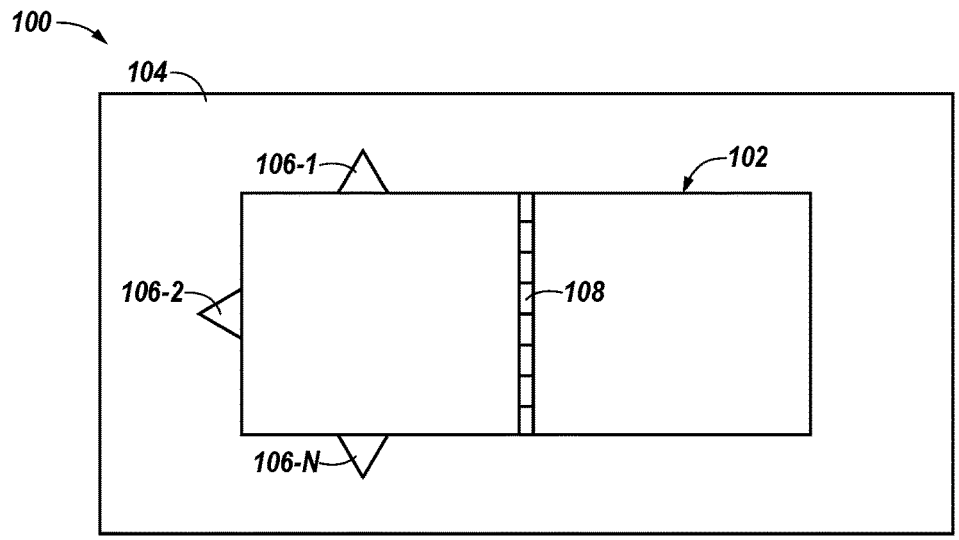
FIG. 1A is a schematic diagram of an apparatus including a cover in a closed position in accordance with a number of embodiments of the present disclosure.

Apparatuses for securing a memory card are provided herein. In a number of embodiments of the present disclosure, an apparatus can include a slot coupled to a printed circuit board (PCB) and configured to receive a memory card to provide electrical connection between the PCB and the memory card. A cover can be coupled to the PCB and configured to enclose the memory card when in a closed position to maintain electrical connection between the memory card and the PCB.

In a number of embodiments of the present disclosure, a memory card can be used in a vehicle to save vehicle sensor data. This vehicle sensor data can be used as part of an accident investigation by vehicle dealers, insurance agents, investigators, and police officers, for example. A cover securing the memory card can prevent corruption or loss of data on the memory card. For example, the cover can prevent a driver of a vehicle from modifying or removing data from the memory card after an accident.

In instances in which the memory card is used in a vehicle, the memory card can be exposed to vibration (e.g., during regular use and/or during an accident). The cover can prevent the memory card from losing electrical connection with the PCB allowing vehicle sensor data to be saved even when the memory card is exposed to vibration.

In the following detailed description of the present disclosure, reference is made to the accompanying drawings that form a part hereof, and in which is shown by way of illustration how a number of embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

As used herein, "a number of" something can refer to one or more of such things. For example, a number of memory devices can refer to one or more memory devices. Additionally, designators such as "N", as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

FIG. 1A is a schematic diagram of an apparatus 100 including a cover 102 in a closed position in accordance with a number of embodiments of the present disclosure. The cover 102 can include a hinge 108 to allow the cover to move between the closed position and an open position. The cover 102 can be coupled to a printed circuit board (PCB) 104. The cover can be made of various materials including metal materials and/or plastic materials; however embodiments are not so limited. The cover 102 can include a number of soldering tips 106-1, . . . , 106-N. The soldering tips 106-1, . . . , 106-N can allow the cover 102 to electrically discharge to ground. The soldering tips 106-1, . . . , 106-N can prevent the cover 102 from electrically discharging to and damaging a memory card (e.g., memory card 114 in FIG. 1B) in a slot (e.g., slot 112 in FIG. 1B) connected to the PCB 104.

The cover 102 can also include features to indicate if the cover 102 has been opened. For example, the cover 102 can include anti-tamper sealers and/or tamper evident labels. In a number of embodiments of the present disclosure, a key can be used to allow the cover 102 to move from a closed position to an open position and/or an open position to a closed position. For example, the key could be available to authorized personnel (e.g., vehicle dealers, insurance agents, investigators, police officers, etc.) only to prevent unauthorized personnel from gaining access to the memory card 114.

Figure 1B:
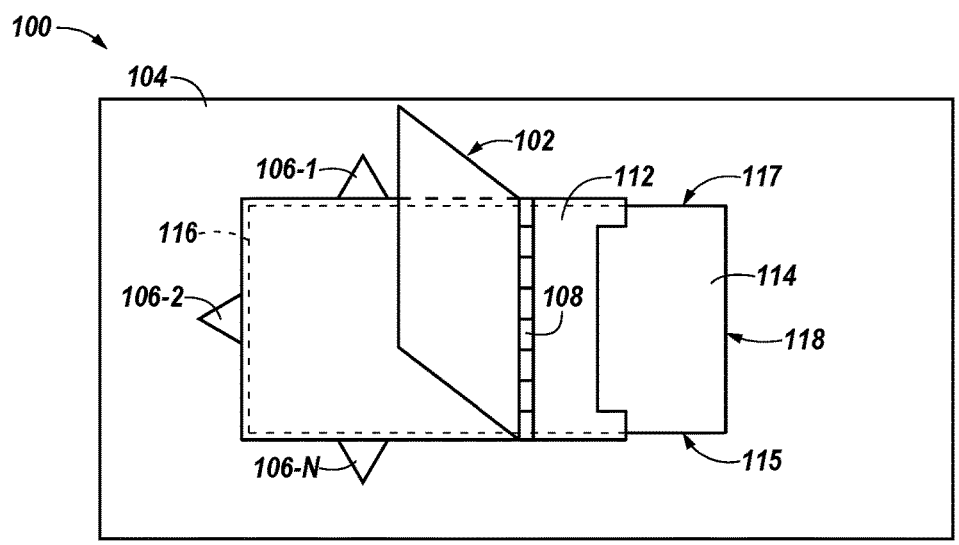
FIG. 1B is a schematic diagram of an apparatus including a cover in an open position in accordance with a number of embodiments of the present disclosure.

FIG. 1B is a schematic diagram of the apparatus 100 of FIG. 1A with the cover 102 in an open position. The cover 102 can include the hinge 108 to allow the cover 102 to move between the open position and the closed position. As shown in FIG. 1B, the apparatus 100 can include a slot 112 coupled to the PCB 104. The slot 112 can be configured to receive a memory card 114 to provide electrical connection between the PCB 104 and the memory card 114. The slot 112 can enclose a first end 115, a second end 116, and a third end 117 of the memory card 114. The slot can leave a fourth end 118 of the memory card 114 exposed. The cover 102 can enclose the first end 115, the second end 116, the third end 117, and the fourth end 118 of the memory card 114. For example, the cover 102 can enclose the fourth end 118 of the memory card 114 that is left exposed by the slot 112.

As an example, the memory card 114 can be a Secure Digital (SD) card or a Micro Secure Digital (μSD) card. In a number of embodiments, the memory card 114 can be used to store vehicle sensor data that can be analyzed as part of an accident investigation, for example. The cover 102, in a closed position, can prevent a user of a vehicle (e.g. driver, owner, and/or passenger) from modifying and/or removing data. The cover 102 can be secured via various methods such as a screw, key, etc.

In instances in which the apparatus 100 is mounted within a vehicle, the memory card 114 can be exposed to vibration (e.g., during regular use and/or during an accident). The slot 112 can be configured to receive insertion of the memory card 114 in a first direction. The cover 102 can be configured to prevent the memory card 114 from movement in a direction opposite the first direction when the cover 102 is in the closed position. For example, the cover 102 can be in contact with an end 118 of the memory card 114 when the cover 102 is in the closed position and the cover 102 can expose the memory card 114 when in an open position. The cover 102 can be configured to maintain an electrical connection between the memory card 114 and the PCB 104 when in the closed position. For example, the cover, in a closed position, can prevent the memory card 114 from losing electrical connection with the PCB 104 when the memory card 114 is exposed to vibration from the vehicle.

Figure 2:
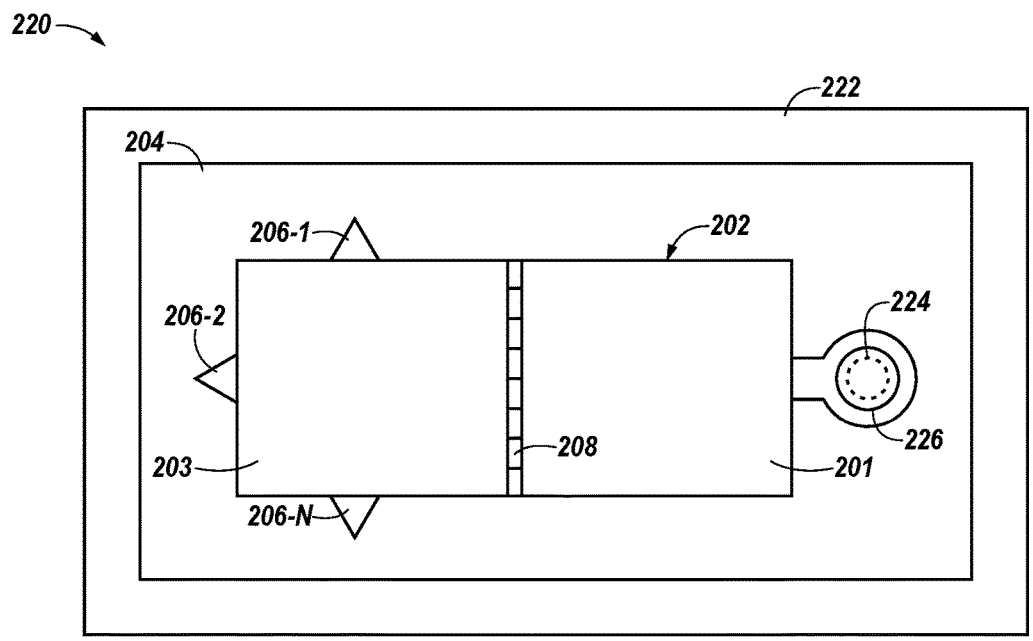
FIG. 2 is a schematic diagram of an apparatus including a tamper resistant device in accordance with a number of embodiments of the present disclosure.

FIG. 2 is a schematic diagram of an apparatus 220 including a tamper resistant device 222 in accordance with a number of embodiments of the present disclosure. The tamper resistant device 222 can be configured to enclose an apparatus such as apparatus 100 described in FIGS. 1A and 1B. In the example shown in FIG. 2, the apparatus 220 includes the tamper resistant device 222, the PCB 204, a screw 226, and the cover 202 including the hinge 208, a first portion 201, a second portion 203, an opening 224, and a number of soldering tips 206-1, . . . , 206-N. As an example, the tamper resistant device 222 can serve as a "black box" within a vehicle.

The tamper resistant device 222 can be attached to a vehicle and can include features to deter the tamper resistant device 222 from being accessed by unauthorized personnel. For example, the tamper resistant device 222 can prevent a user of a vehicle (e.g. driver, owner, and/or passenger) from modifying and/or removing data. The tamper resistant device 222 can also include features to indicate if the tamper resistant device 222 has been accessed. For example, the tamper resistant device 222 can include anti-tamper sealers and/or tamper evident labels.

In a number of embodiments of the present disclosure, the cover 202 can include the opening 224 for the screw 226 to lock the cover 202 to the PCB 204. The cover 202 can also include the hinge 208. The hinge 208 can connect a first portion 201 of the cover 202 and a second portion 203 of the cover 202. The cover 202 can be in an open position when the screw 226 is removed from the opening 224 in the cover 202. When the screw 226 is removed, the first portion 201 of the cover 202 can pivot from a closed position to an open position, for example.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
   a slot coupled to a printed circuit board (PCB), wherein the slot is configured to receive a memory card to provide electrical connection between the PCB and the memory card; and
   a cover, including a number of soldering tips, coupled to the PCB and configured to:
      enclose the memory card when in a closed position; and
      maintain electrical connection between the memory card and the PCB when in the closed position.

2. An apparatus, comprising:
   a slot coupled to a printed circuit board (PCB), wherein the slot is configured to receive a memory card to provide electrical connection between the PCB and the memory card; and
   a cover coupled to the PCB and configured to:
      enclose the memory card when in a closed position; and
      maintain electrical connection between the memory card and the PCB when in the closed position; and
   wherein the cover includes at least one of:
      an opening for a screw to lock the cover to the PCB; or
      a hinge that connects a first portion of the cover and a second portion of the cover.

3. The apparatus of claim 1, wherein the number of soldering tips allow the cover to electrically discharge to ground.

4. The apparatus of claim 1, wherein the cover includes an opening for a screw to lock the cover to the PCB.

5. The apparatus of claim 1, wherein the cover includes a hinge that connects a first portion of the cover and a second portion of the cover.

6. The apparatus of claim 1, wherein the memory card is one of a Secure Digital (SD) card and a Micro Secure Digital (μSD) card.

7. The apparatus of claim 1, wherein the slot is configured to receive insertion of the memory card in a first direction, and wherein the cover is configured to prevent the memory card from movement in a direction opposite the first direction when the cover is in the closed position.

8. The apparatus of claim 1, wherein the cover is enclosed by a tamper resistant device.

9. An apparatus, comprising:
 a slot coupled to a printed circuit board (PCB) and configured to have a memory card inserted therein to provide electrical connection between the PCB and the memory card; and
 a cover coupled to the PCB and configured to:
  enclose the memory card when in a closed position; and
  prevent the memory card from moving within the slot when in the closed position such that electrical connection between the memory card and the PCB is maintained, wherein the cover is in contact with an edge of the memory card when the cover is in the closed position.

10. The apparatus of claim 9, wherein the cover exposes the memory card when in an open position.

11. An apparatus, comprising:
 a slot coupled to a printed circuit board (PCB), wherein the slot is configured to receive a memory card to provide electrical connection between the PCB and the memory card; and
 a cover coupled to the PCB and configured to:
  enclose the memory card when in a closed position; and
  maintain electrical connection between the memory card and the PCB when in the closed position; and
 wherein the slot is configured to receive insertion of the memory card in a first direction, and wherein the cover is configured to prevent the memory card from movement in a direction opposite the first direction when the cover is in the closed position.

12. An apparatus, comprising:
 a slot coupled to a printed circuit board (PCB) and configured to have a memory card inserted therein to provide electrical connection between the PCB and the memory card; and
 a cover coupled to the PCB and configured to:
  enclose the memory card when in a closed position; and
  prevent the memory card from moving within the slot when in the closed position such that electrical connection between the memory card and the PCB is maintained; and
 wherein the slot encloses the memory card on four sides.

13. The apparatus of claim 9, wherein the apparatus includes a tamper resistant device configured to enclose the PCB, the slot, the memory card, and the cover.

14. The apparatus of claim 9, wherein the slot encloses the memory card on four sides.

15. The apparatus of claim 9, wherein the cover encloses the memory card on five sides.

16. The apparatus of claim 9, wherein the cover encloses the slot on five sides.

17. An apparatus, comprising:
 a slot coupled to a printed circuit board (PCB) and configured to have a memory card inserted therein to provide electrical connection between the PCB and the memory card;
 a cover, including features to indicate the cover has been opened, coupled to the PCB and configured to:
  enclose the memory card when in a closed position; and
  prevent the memory card from moving within the slot when in the closed position such that electrical connection between the memory card and the PCB is maintained; and
 a tamper resistant device configured to enclose the PCB, the slot, the memory card, and the cover.

18. The apparatus of claim 17, wherein the apparatus is attached to a vehicle.

19. The apparatus of claim 17, wherein the tamper resistant device includes features to deter the tamper resistant device from being accessed by unauthorized personnel.

20. The apparatus of claim 17, wherein the tamper resistant device includes features to indicate the tamper resistant device has been accessed.

21. An apparatus, comprising:
 a slot coupled to a printed circuit board (PCB) and configured to have a memory card inserted therein to provide electrical connection between the PCB and the memory card; and
 a cover coupled to the PCB and configured to:
  enclose the memory card when in a closed position; and
  prevent the memory card from moving within the slot when in the closed position such that electrical connection between the memory card and the PCB is maintained; and
 wherein the cover encloses at least one of:
  the memory card on five sides; or
  the slot on five sides.

22. The apparatus of claim 17, wherein the memory card includes vehicle sensor data.

23. The apparatus of claim 22, wherein the vehicle sensor data includes data associated with an accident.

* * * * *